(12) United States Patent
Diedrichs et al.

(10) Patent No.: US 8,981,708 B2
(45) Date of Patent: Mar. 17, 2015

(54) ELECTRICAL CHARGING APPARATUS

(75) Inventors: Volker Diedrichs, Wardenburg (DE); Alfred Beekmann, Wiesmore (DE)

(73) Assignee: Aloys Wobben, Aurich (DE)

( * ) Notice: Subject to any disclaimer, the term of this patent is extended or adjusted under 35 U.S.C. 154(b) by 506 days.

(21) Appl. No.: 13/399,855

(22) Filed: Feb. 17, 2012

(65) Prior Publication Data
US 2013/0043825 A1    Feb. 21, 2013

Related U.S. Application Data

(63) Continuation-in-part of application No. PCT/EP2010/061975, filed on Aug. 17, 2010.

(30) Foreign Application Priority Data

Aug. 19, 2009  (DE) .......................... 10 2009 038 033

(51) Int. Cl.
*H01M 10/44*    (2006.01)
*H02J 7/00*    (2006.01)
(Continued)

(52) U.S. Cl.
CPC ........... *H02J 7/0027* (2013.01); *B60L 11/1824* (2013.01); *H02J 3/18* (2013.01);
(Continued)

(58) Field of Classification Search
CPC ......... B60L 11/1811; H02J 3/32; H02J 3/386; H02J 7/0027; H02J 7/0055
USPC ................................ 320/101, 109; 307/82, 87
See application file for complete search history.

(56) References Cited

U.S. PATENT DOCUMENTS

| | | | |
|---|---|---|---|
| 5,103,923 | A | 4/1992 | Johnston et al. |
| 5,642,270 | A | 6/1997 | Green et al. |

(Continued)

FOREIGN PATENT DOCUMENTS

| | | |
|---|---|---|
| DE | 692 20 228 T2 | 9/1997 |
| DE | 10008028 A1 | 9/2001 |

(Continued)

OTHER PUBLICATIONS

Madawala, U.K., ""Living and Mobility"—A Novel Multipurpose in-house Grid Interface with Plug in Hybrid Blue Angle", Sustainable Energy Technologies, 2008. ICSET 2008. IEEE International Conference, Nov. 24, 2008, pp. 531-536.

(Continued)

*Primary Examiner* — M'Baye Diao
(74) *Attorney, Agent, or Firm* — Seed IP Law Group PLLC

(57) ABSTRACT

The present invention concerns a charging apparatus for charging electric storage devices of electric vehicles including a feed-in unit for feeding electric energy into an electric ac voltage network including an electric dc voltage intermediate circuit for the intermediate storage of electric energy with an intermediate circuit voltage, and an inverter for converting a direct current of the dc voltage intermediate circuit into an alternating current, for feeding it into the electric ac voltage network and for converting an alternating current from the ac voltage network into a direct current for feeding it into the dc voltage intermediate circuit, and at least one electric storage charge circuit for at least partial charging of one of the electric storage devices from the dc voltage intermediate circuit and for at least partial discharging of one of the electric storage devices into the dc voltage intermediate circuit.

18 Claims, 2 Drawing Sheets

(51) Int. Cl.
*H02J 3/02* (2006.01)
*B60L 11/18* (2006.01)
*H02J 3/18* (2006.01)
*H02J 3/32* (2006.01)

(52) U.S. Cl.
CPC .............. *H02J 3/32* (2013.01); *B60L 11/1811* (2013.01); *B60L 11/184* (2013.01); *B60L 11/1844* (2013.01); *B60L 11/1866* (2013.01); *Y02E 40/30* (2013.01); *Y02T 10/7055* (2013.01); *B60L 2230/24* (2013.01); *Y02T 10/7088* (2013.01); *Y02T 10/7005* (2013.01); *Y02T 10/7061* (2013.01); *Y02T 90/163* (2013.01); *Y02T 90/169* (2013.01); *Y02T 90/14* (2013.01); *Y02T 90/128* (2013.01); *Y02T 90/127* (2013.01); *Y04S 10/126* (2013.01); *Y04S 30/14* (2013.01); *Y02E 60/721* (2013.01); *Y02T 10/7094* (2013.01); *Y02E 70/30* (2013.01); *Y02E 10/763* (2013.01)
USPC ................ 320/101; 320/109; 307/82; 307/87

(56) References Cited

U.S. PATENT DOCUMENTS

| | | | |
|---|---|---|---|
| 5,926,004 | A | 7/1999 | Henze |
| 6,109,229 | A * | 8/2000 | Pels ............................ 123/179.6 |
| 7,471,007 | B2 * | 12/2008 | Bucker et al. .................... 290/44 |
| 8,212,409 | B2 * | 7/2012 | Bettenwort et al. ............. 307/82 |
| 2006/0192435 | A1 | 8/2006 | Parmley |
| 2008/0077452 | A1 | 3/2008 | Dugan et al. |
| 2009/0174926 | A1 | 7/2009 | Maeda et al. |
| 2009/0189456 | A1 | 7/2009 | Skutt |
| 2011/0116294 | A1 * | 5/2011 | Wolf ............................ 363/132 |

FOREIGN PATENT DOCUMENTS

| | | |
|---|---|---|
| DE | 10331084 A1 | 3/2005 |
| EP | 1 467 463 A1 | 10/2004 |
| EP | 2 362 362 B1 | 4/2013 |
| JP | 2003-339118 A | 11/2003 |
| JP | 2004-88900 A | 3/2004 |
| JP | 2008131841 A | 6/2008 |
| TW | M335083 U | 6/2008 |
| WO | 2005008808 A2 | 1/2005 |
| WO | 2011020831 A2 | 2/2011 |

OTHER PUBLICATIONS

Dirk Uwe Sauer, "Elektrische Energiespeicher in Hybrid- und Elektrofarhzeugen", Seminar für Kraftfahrzeug- und Motorentechnik Berlin, Jan. 29, 2009.

Sutanto, D.: "Alternative Energy Resource from Electric Transportation", Power Electronics Systems and Applications, 2004 Proceedings, 2004 First International Conference on Nov. 9-11, 2004, pp. 149-153.

Hartge, S., "FACTS Capabilities of Wind Energy Converters", EWEC 2006—European Wind Energy Conference & Exhibition, Athens, pp. 1-9, Feb. 28, 2006.

De Breucker: "Grid Power Quality Improvements Using Grid-Coupled Hybrid Electric Vehicles", PEMD 2006. Power Electronics, Machine and Drives, 2006. The 3rd IET International Conference on Apr. 4-6, 2006, pp. 505-509.

Kramer, W. et al., "Advanced Power Electronic Interfaces for Distributed Energy Systems Part 1: Systems and Topologies", Technical Report NREL/TP-581-42672, 132 pages, Mar. 2008.

Windblatt Enercon Magazin für Windenergie, Apr. 2008, 16 pages.

"Verordnung zu Systemdienstleistungen durch Windenergieanlagen (Systemdienstleistungsverordnung—SDLWindV)", Bundesgesetzblatt Jahrgang 2009 Teil I Nr. 39, ausgegeben zu Bonn am Jul. 10, 2009, pp. 1734-1746, Jul. 3, 2009.

Windblatt Enercon Magazine for wind energy, issue Apr. 2008, 16 pages.

English Translation of Taiwanese Office Action dated Jun. 6, 2013, for corresponding Taiwanese Patent Application No. 099127612, 7 pages.

* cited by examiner

ELECTRICAL CHARGING APPARATUS

BACKGROUND

1. Technical Field

The present invention concerns a charging apparatus for charging electric storage devices of electric vehicles. The present invention further concerns a wind power installation and also an electric filling station as well as the use of a feed-in unit of a wind power installation and a method of controlling a charging apparatus connected to an ac voltage network.

2. Description of the Related Art

Electric vehicles are becoming increasingly important because of the present worldwide energy shortage of fossil fuels and also the known poor efficiency of spark-ignition engines and even diesel engines. In that respect, the term electric vehicle is used to denote in particular a passenger car powered by one or more electric motors. That can also include hybrid vehicles which can be powered not only by an electric motor but which additionally have another engine such as internal combustion engine.

Such electric vehicles frequently store their energy in electric storage devices, also called batteries. In accordance with the present invention and the description hereinafter the terms electric storage device, accumulator, battery, and accu battery are used to denote any electric storage device which can store the electric power that can be supplied to one or more electric drive motors of an electric vehicle. An electric vehicle includes any vehicle that moves under electric power and includes in particular an electric car. The storage capacities of such electric storage devices can be for example 30 to 50 kWh, and are typically 35 kWh.

An electric storage device is also referred to herein by the term accumulator or for brevity an accu battery. Thus the terms electric storage device and battery are intended to be used in the broad sense of any device that will store electricity and not just chemical types.

In particular a distinction can be made between two general concepts for charging such electric storage devices. In accordance with one concept the electric storage devices are charged directly on the car, in which case the electric storage device remains on the car or other electric vehicle while it is being charged. Another concept proposes replacing an entirely or partially discharged electric storage device by a charged one. In this second concept the electric vehicle needing more power therefore goes to a location at which at least one electric storage device of the same structure is provided in the charged condition and the entirely or partially discharged electric storage device is replaced by the fully charged and ready to use electric storage device. The entirely or partially remaining electric storage device can then be charged up while the electric vehicle can continue to be driven. The second concept has the benefit of being much faster to provide a fully charged electric storage device to an electric vehicle so it can continue to be driven.

Such an electric storage device replacement operation can be provided preferably at a central location such as an electric filling station. Therefore the term electric filling station is used to denote any location at which an electric vehicle can receive electric power, either by charging or replacement of the electric storage device. To ensure good availability such an electric filling station must have a large number of electric storage devices in stock. If it is assumed for example that there are 50 electric storage devices in stock which have to be charged up, with a charging power requirement of 50 to 100 kW per electric storage device, that electric filling station in this example must have a charging power of 2.5 to 5 MW.

Such a charging power makes high demands not only on the charging apparatus as such but also on the link to an electric supply network or to a corresponding branch of the electric supply network which leads to the aforementioned electric filling station, and to the aforementioned charging apparatus.

In that respect it is to be noted that, upon an increase that is to be expected in the number of electric vehicles, it is necessary to plan for not only on an electric filling station but a plurality of and optimally a large number of electric filling stations which are distributed to cover a large area. The aim would be to provide such a situation for the electric vehicle users so they can be assured of always having the ability to have sufficient electric power to drive their electric vehicle.

As general state of the art, attention is directed to the following documents: DE 103 31 084 A1, WO 2005/008808 A2, U.S. Pat. No. 2006/0192435 A1 and DE 100 08 028 A1 and a publication by Dirk Uwe Sauer, "Elektrische Energiespeicher in Hybrid-und Elektrofarhzeugen", Seminar für Kraftfahrzeug-und Motorentechnik Berlin, Jan. 29, 2009.

BRIEF SUMMARY

Therefore one goal of the present invention is to provide a solution for at least one of the above-described problems or challenges. In particular, one object of the invention is to provide an efficient solution for charging a large number of electric storage devices in a system for use by electric vehicles in the electric supply network as described herein.

According to the invention there is propose a charging apparatus in accordance with claim 1.

Such a charging apparatus includes a feed-in unit for feeding electric energy into an electric ac voltage network and an electric storage charge circuit a charging connection unit for the connection of an electric storage charge circuit for charging and/or discharging one of the electric storage devices.

The feed-in unit includes an electric dc voltage intermediate circuit for the intermediate storage of electric energy. The electric dc voltage intermediate circuit has an intermediate circuit voltage, wherein said intermediate circuit voltage does not have to be constant.

In addition the feed-in unit includes an inverter assembly—also referred to as a frequency inverter or dc/ac converter—which is provided for converting a direct current or a dc voltage from a dc voltage intermediate circuit into an alternating current for feeding into the electric ac voltage network. The inverter assembly is also able to act as a converter for converting an alternating current from the ac voltage network into a direct current or into a dc voltage for feeding into or charging the dc voltage intermediate circuit. Thus, the terms inverter or inverter assembly as used herein include both a dc to ac conversion and an ac to dc conversion capability. The term inverter as used herein is intended in the broad sense of any device that can convert ac to dc or dc to ac or both.

In accordance with the present invention there can be provided a charging apparatus having only one electric storage charge circuit or a corresponding connection for charging. Nonetheless for reasons of efficiency it is to be assumed that there is a plurality of and in particular a multiplicity of electric storage charge circuits. Each electric storage charge circuit is intended to charge and/or discharge an electric storage device. In that respect hereinafter the term charge or discharge is also used to denote partial charging or partial discharging. Finally the charging apparatuses should be adapted to the respective electric storage device and any other boundary conditions.

The energy for charging each connected electric storage device is taken from the dc voltage intermediate network.

Preferably, the intermediate circuit storage device itself can usually only store a small amount of energy and rather operates in the sense of a buffer.

When discharging an electric storage device the energy or the discharge current is suitably passed to the dc voltage intermediate network. Discharging of an electric storage device or a multiplicity of electric storage devices connected to the charging apparatus is intended to feed electric energy into the ac voltage network. If available energy is present in the electric storage device, it can be fed into the ac voltage network for various purposes.

It is possible to meet an energy need of the charging apparatus. In particular, a feed-in of energy from the electric storage devices is possible during peak load times on the ac network. Thus energy can be briefly fed into the ac voltage network from the electric storage devices at peak load times to cover the demand placed on the ac network. At the end of such peak load times the corresponding electric storage devices can then be charged up again from the ac voltage network.

The energy of one electric storage device of an electric vehicle is low in comparison with usual energy levels required on an electric ac voltage network, in particular the requirement for additional energy demand in peak load times. In accordance with the invention however it is possible and preferably provided that a large number of electric storage devices are connected to a charging apparatus so that the charging apparatus can have a correspondingly large amount of energy or feed-in power for feeding energy into the ac voltage network. If in addition the use of a plurality of and in particular a multiplicity of charging apparatuses according to the invention to which a respective multiplicity of electric storage devices is connected is taken into consideration, a considerable amount of energy and available feed-in power can come together to provide power into the ac network. Accordingly, a gas-fired power station provided to be available for peak loads can be rendered unnecessary if the corresponding storage capacities of the electric storage devices are provided together at peak times.

The charging apparatus according to the invention is proposed for technical implementation. Electric energy of one and in particular a plurality of electric storage devices can be fed to the dc voltage intermediate circuit by way of corresponding electric storage charge circuits and fed from the inverter into the ac voltage network at peak demand times.

Preferably the feed-in unit of the charging apparatus is provided for feeding reactive power into the electric ac voltage network. Thus it is possible that the charging apparatus can additionally achieve support for the electric ac voltage network by the feed-in of reactive power. In one embodiment, the feed-in of reactive power can be effected by feeding in electric current with a suitable phase position in comparison with the phase position of the ac voltage in the ac voltage network at the feed-in point. The details are familiar to a person of skill in the art and attention is directed to pertinent technical literature, for example Mohan, Undeland, Robbins: *Power Electronics*; John Wiley&Sons; ISBN: 0-471-58408-8.

As was already mentioned in the opening part of this specification, the present invention and in particular an embodiment thereof is based on the realization that, with a corresponding increase in electric vehicles, it is expected that there will be an increase in electric filling stations and thus an increase in charging apparatuses according to the invention, in which case electric filling stations will be distributed to cover an area similar to conventional filling stations that provide gasoline or diesel fuel. The capability in respect of the charging apparatus of supporting the ac voltage network is then particularly advantageous at locations or in regions which are at a great distance relative to a large energy generator which feeds into the ac voltage network such as a power station. In other words, distribution of charging apparatuses according to the invention in such a way as to cover an area, as is possible by electric filling stations, also permits corresponding area-coverage to support power input to the electric ac voltage network.

A preferred embodiment for a charging apparatus according to the invention proposes the use of a feed-in unit to generate the electric power of a wind power installation.

It is advantageous in that respect that feed-in units of modern wind power installations are often already capable of feeding reactive power in specific targeted fashion into the electric ac voltage network. Rather, such feed-in units are also otherwise adapted to a large number of demands on the part of the operators of electric ac voltage networks, they are often FACTS-capable and are also tested and proven reliable in such an ac network. In addition the dimensioning of such feed-in units is suited to a use, for example as a charging apparatus, for an electric filling station as mentioned hereinbefore by way of example, if it is borne in mind that modern wind power installations often have a standard power output of more than 5 MW.

In addition feed-in units of wind power installations frequently already have a structure of the type proposed in accordance with the charging apparatus of the invention, namely the use of a dc voltage intermediate circuit having an inverter or dc/ac converter. It is thus only necessary for each electric storage charge circuits, for charging and/or discharging an electric storage device, to be adapted to the dc voltage intermediate circuit of the feed-in unit of a wind power installation, and connected thereto. In that respect it is not necessary but it is possible that a wind power installation itself is provided, that is to say all components which are required to connect the above-mentioned dc voltage intermediate circuit to the generator, as well as the generator and the rotor including rotor blades themselves. In addition, a wind power installation is also connected to the ac network to provide power to the network when it is producing electric energy from the wind. The wind power installation thus has the ability to both obtain power from the ac network and provide power to the ac network. In addition, wind power installations can be spaced over a large area.

It will be appreciated that a transformer which is adapted to the feed-in of electric power from a wind power installation can also be used together with a charging apparatus to remove power from the ac network according to the invention.

Preferably the feed-in unit contains circuitry for controlling the intermediate circuit voltage to a predeterminable value. In general, depending on the respective operating condition, there will usually be a preferred value for the intermediate circuit voltage. It should generally be low to protect semiconductor components used in the inverter, to achieve a service life which is as long as possible and be able to use industry standard semiconductor components. At the same time however that value is preferred to be high so that an efficient exchange and feed into the ac voltage network is possible.

Preferably the feed-in unit is designed for a 4-quadrant mode of operation. In the present case that expression is used to denote a mode of operation in which active power can be fed into or taken from the ac voltage network selectively. In addition reactive power can be fed into or taken from the ac voltage network selectively. Both options of active power on the one hand and reactive power on the other hand can be respectively combined so that operation in each of the corresponding 4 quadrants is possible. It will be appreciated that active power and/or reactive power can also assume the value of zero at a respective or at the same time.

To ensure such a 4-quadrant mode of operation, there can be provided for example a feed-in unit which can ensure a bidirectional mode of operation, namely to feed alternating current from the dc voltage intermediate circuit into the ac voltage network and, also in the other direction, to feed direct current from the electric ac voltage network into the dc voltage intermediate circuit.

In a further embodiment the charging apparatus has an input interface for the input of an active power reference value for predetermining an active power which is to be fed into or taken from the ac voltage network and/or for the input of a reactive power reference value for predetermining a reactive power to be fed into or taken from the ac voltage network. It is thus provided in that respect that that active power reference value and/or reactive power reference value is predetermined from outside of the charging apparatus. Then—as far as possible—the charging apparatus implements that presetting or presettings. The active power reference value and the reactive power reference value can be basically differently handled.

The presetting of an active power reference value primarily concerns a qualitative indication, more specifically in particular whether active power is to be fed in to the ac voltage network or can be taken therefrom. The magnitude of the active power to be fed into the network or taken therefrom can also be generally predetermined, but it also may vary depending on the capacity of the connected electric storage devices. Preferably a correspondingly maximum active power is fed in or taken from the network.

The reactive power reference value also includes the information as to whether reactive power is to be fed into or taken from the ac voltage network, in which respect however the reactive power reference value can preferably assume qualitative values which are usually within predetermined limits. In other words, the reference value is here gradually predetermined. The ability of a number of electric storage devices to feed in or take reactive value to or from the ac network is a particular benefit. It is also to be noted that feeding reactive power into the network or taking therefrom is basically independent of the capacity of the connected electric storage devices.

The above-mentioned external presetting, both in respect to an active power reference value and also a reactive power reference value, makes it possible to correspondingly react to needs of the network. Compensating for peak load times or taking active power when there is a corresponding energy surplus on the one hand can be achieved basically independently and at the same time to support the ac voltage network in the sense of the transmission properties of the ac voltage network—or a corresponding portion thereof—on the other hand. External presetting of those two reference values, which can be effected for example by the network operator, also makes it possible overall to implement co-ordination of a plurality of charging apparatuses coupled to the ac voltage network and thus specifically targeted and differentiated influencing of the network condition. That is also proposed in accordance with an embodiment of the invention.

A further embodiment proposes that the at least one electric storage charge circuit and in particular each electric storage charge circuit that is electrically connected to the dc voltage intermediate circuit is designed to be insensitive to variations in the intermediate circuit voltage. Thus, in spite of the connected electric storage charge circuit, the feed-in unit can be operated in such a way that a variation in the amplitude of the intermediate circuit voltage and thus the setting of a respective preferred value for the intermediate circuit voltage are possible.

In principle the person skilled in the art knows how insensitivity to changes in voltage, which in the technical language in the art is also referred to as robustness, can be achieved. It is clear that the electric storage charge circuit must be adapted to the width of variation to be expected in the intermediate voltage value. In other words, besides a dielectric or disruptive strength, the electric storage charge circuits must be so designed that it can still control a charging or discharging current at the lowest intermediate voltage to be expected and it can control a charging or discharging current for the dc voltage intermediate circuit at the greatest intermediate circuit voltage to be expected. In that respect the electric storage charge circuit should conform to the charging conditions to be encountered—which also includes the discharging conditions.

Furthermore the electric storage charge circuits should be matched in respect of its dynamics to the dynamics of the feed-in unit. That is effected such that the dynamics of the feed-in unit are set substantially faster than those of the electric storage charge circuits. In other words time constants of the feed-in unit—such as for example the choice or matching of a choke, an intermediate circuit capacitance as well as actuation times and time constants of filters of the measurement and regulating structure—are selected to be as low as possible whereas corresponding time constants of the electric storage charge circuits are selected to be correspondingly great. As a result it is desirable for the feed-in unit to have a dominant time constant which is smaller at least by the factor of 10 than the dominant time constant of the electric storage charge circuits. Such a design configuration is also referred to as hierarchizing and avoids unwanted mutually influencing of the regulating effects in respect of the feed-in unit and the electric storage charge circuit.

In accordance with a further embodiment it is proposed that the charging apparatus includes a network service power control unit for coordinating control of the feed-in unit and at least one electric storage charge circuit. As a basis for that purpose the network service power control unit can obtain external presetting values such as the active power reference value and the reactive power reference value. In particular implementation of the active power reference value requires matching between the feed-in unit and the electric storage charge circuits and thus in particular the active power fed into the network can be afforded by the electric storage charge circuits and therewith by the electric storage devices at the dc voltage intermediate circuit and thus the active power required for charging the electric storage devices is taken from the network. In particular the network service power detection unit is in communication with each electric storage charge circuit and in particular a respective control unit provided at the charging unit, and it is in communication with an inverter control unit for controlling the inverter or dc/ac converter.

In accordance with a further configuration the electric storage charge circuit or each electric storage charge circuit includes a buck converter connected to the dc voltage intermediate circuit and/or a boost converter connected to the dc voltage intermediate circuit. The buck converter is provided to control a respective charging current from the dc voltage intermediate circuit, in particular in accordance with a charging procedure for charging the connected electric storage device. Correspondingly the boost converter is provided to control a discharging current and to feed it to the dc voltage intermediate circuit.

Thus in accordance with an embodiment there can be easily provided a charging apparatus in which a feed-in unit of a wind power installation is used, wherein it has a dc voltage intermediate circuit and connected to said dc voltage intermediate circuit are a buck converter and a boost converter for each electric storage charge circuit to be charged in parallel, in order to control a charging current and a discharging current respectively.

Preferably the at least one electric storage charge circuit—preferably each electric storage charge circuit—has an electric storage device control unit which detects the charging and discharging current and/or a corresponding voltage. That charging voltage basically corresponds to the voltage at the connected electric storage charge circuit. Preferably the charge condition of the connected electric storage device is ascertained from those measurement values. In addition the respective charging power and discharging power of the connected electric storage device can be ascertained.

Preferably there are provided a plurality of electric storage charge circuits for—entirely or partially—charging and/or discharging a respective electric storage device. Basically each electric storage charge circuit is provided for individually charging or discharging the connected electric storage device. Individual charging or discharging must take account in particular of the respective charge condition and also the type of the connected electric storage device. It is important that the electric storage charge circuits can charge or discharge the connected electric storage device, independently of each other. In dependence on the respective electric storage device to be charged or discharged, it is appropriate to use a suitably adapted electric storage charge circuit. All electric storage charge circuits however are adapted for connection to the dc voltage intermediate circuit. In that respect, the feed of electric power into the ac voltage network or taking required power from the network is substantially independent of the nature of the electric storage charge circuit. Basically only the charging capacity has to be taken consideration.

In accordance with a further embodiment it is proposed that the feed-in unit is provided for connection to a wind power installation to make an electric connection between the wind power installation and the dc voltage intermediate circuit. Particularly when using a feed-in unit of a wind power installation, that is a feature that is simple to embody. That measure provides that electric energy which was obtained from wind energy by the wind power installation can be used for charging connected electric storage devices. Major changes of the wind power installation does not need otherwise to be necessary. For example, charging of the electric storage devices can also be adapted to the respective wind power. Likewise the electric power generated by the wind power installation can be fed into the electric ac voltage network, basically in known manner.

Preferably the charging apparatus has a switching circuit for selecting a mode of operation with or without a wind power installation and a mode of operation with or without an electric storage charge circuit—or a plurality of electric storage charge circuits. Thus the switching circuit can select between four operating conditions, wherein implementation can also be effected for example by two switching devices, namely a first switch selecting operation with or without a wind power installation and selecting with or without an electric storage charge circuit with a second switch. The provision of such a switching circuit has the advantage that the configuration in which the charging apparatus is to be used does not yet have to be known and thus taken into consideration, in manufacture of the charging apparatus. That permits a reduction in the manufacturing variation. In addition it is also possible to decide at a later time on selecting a further operating condition. In that respect a charging apparatus which is particularly preferred is one which uses a charging connection for connecting to an electric storage charge circuit. Thus it is even possible to provide a charging apparatus initially only for operation with a wind power installation for feeding generated energy into an ac voltage network. Optionally, it is later possible to decide, for example, to provide electric storage charge circuits for charging electric storage devices, at or in the proximity of the wind power installation.

It should be pointed out that an operating condition, both without a wind power installation and also without electric storage charge circuits, may also be appropriate because that still permits network support in respect of feeding in or taking reactive power from the network. Preferably the charging apparatus, in particular the feed-in unit, is FACTS-capable.

The FACTS denotes "Flexible Alternating Current Transmission System". FACTS is defined by the IEEE as a system which is based on power electronics and other static equipment which controls a control of one or more ac transmission system parameters to improve controllability and enhance the capability of power transmission (see "proposes terms and definitions for flexible AC transmission systems (FACTS)", IEEE transactions on power delivery, volume 12, issue 4, October 1997, pages 1848 to 1853). Such FACTS properties are basically familiar to the person skilled in the art. Feeding reactive power in specifically targeted fashion into the ac voltage network or taking it therefrom is in that respect an aspect of the above-mentioned FACTS-capability. A simple possible way of implementing such FACTS-capability involves using a feed-in unit of a wind power installation, which has FACTS-capabilities.

In addition, according to the invention there is proposed a wind power installation for converting wind power into electric energy, which includes a charging apparatus according to the invention or includes the components of such a charging apparatus. In an embodiment this means that a wind power installation including a feed-in unit of a wind power installation is additionally equipped with at least one electric storage charge circuits and/or a charging connection for the connection of an electric storage charge circuit, wherein an electric storage device connected to the electric storage charge circuit can be charged and/or discharged by means of the electric storage charge circuit and the feed-in unit.

In accordance with the invention there is also proposed an electric filling station including a charging apparatus according to the invention and/or a wind power installation according to the invention. In addition the electric filling station includes at least one electric storage device connected to the charging apparatus. The electric storage device is preferably one which is provided for being placed in the charged condition into an electric vehicle in place of an entirely or partially discharged electric storage device of that electric vehicle. In other words, the electric storage device connected for the charging operation is not disposed in an electric vehicle, but can be installed in such a vehicle.

Preferably the electric filling station includes a multiplicity of electric storage devices and is provided for simultaneously charging and/or discharging a multiplicity of electric storage devices.

In addition in accordance with the invention it is proposed using a feed-in unit of a wind power installation as a feed-in unit of a charging apparatus. In particular the use is proposed in a charging apparatus having one or more electric storage charge circuits to be coupled to the feed-in unit. It is thus possible to use a feed-in unit which is firstly provided in all its features for use in a wind power installation, but in accordance with the invention is also useful for a charging apparatus. Optionally the feed-in unit can be adapted for use in a charging apparatus, in such a way that there are provided at least connections for the connection of an electric storage charge circuit.

According to the invention there is also proposed a method of controlling a charging apparatus connected to an ac voltage network for charging and/or discharging electric storage devices in electric vehicles. In that case at least one item of presetting information is received from a control unit or the like, wherein that information predetermines whether and/or how much active power is to be fed into or taken from the ac voltage network. In addition the presetting information can additionally or alternatively predetermine whether and/or in what amount reactive power is to be fed into or taken from the ac voltage network. Such presetting information is always repetitively received. This therefore preferably does not involve a one-time item of information but such information is continuously updated, in particular being communicated from a control station to the charging apparatus. In that case the control station may supply a plurality of charging apparatuses in part with different items of presetting information.

In dependence on the presetting information, the charging apparatus is then controlled in such a way that active power is correspondingly fed into or taken from the ac voltage network and in addition, as far as possible, in accordance with the presetting information, reactive power is fed into and/or taken from the ac voltage network. Additionally or alternatively the charging apparatus is so controlled that at least one of the connected electric storage devices is at least partially charged or discharged. In regard to the feed of active power into the ac voltage network or taking active power therefrom, matching with the control of charging and/or discharging of connected electric storage devices is advantageous.

Preferably a plurality of electric storage devices are connected to the charging apparatus, which can be charged or discharged individually, in particular in each case independently of each other. That independence substantially concerns respectively observing charging rules which predetermine the nature and manner of charging or discharging of the respective electric storage device, in dependence on the type and charge condition. In regard to whether charging or discharging is effected, conforming the same type of control of a plurality of or all connected electric storage devices is to be preferred. Preferably therefore either all electric storage devices are being charged up, or all electric storage devices are being discharged as a group.

It is however also possible to provide a mode of operation in which some electric storage devices are being charged and others are being discharged at the same time.

BRIEF DESCRIPTION OF THE SEVERAL VIEWS OF THE DRAWINGS

The invention is described in greater detail hereinafter by way of example by means of embodiments with reference to the accompanying Figures.

DETAILED DESCRIPTION

Figure 1:
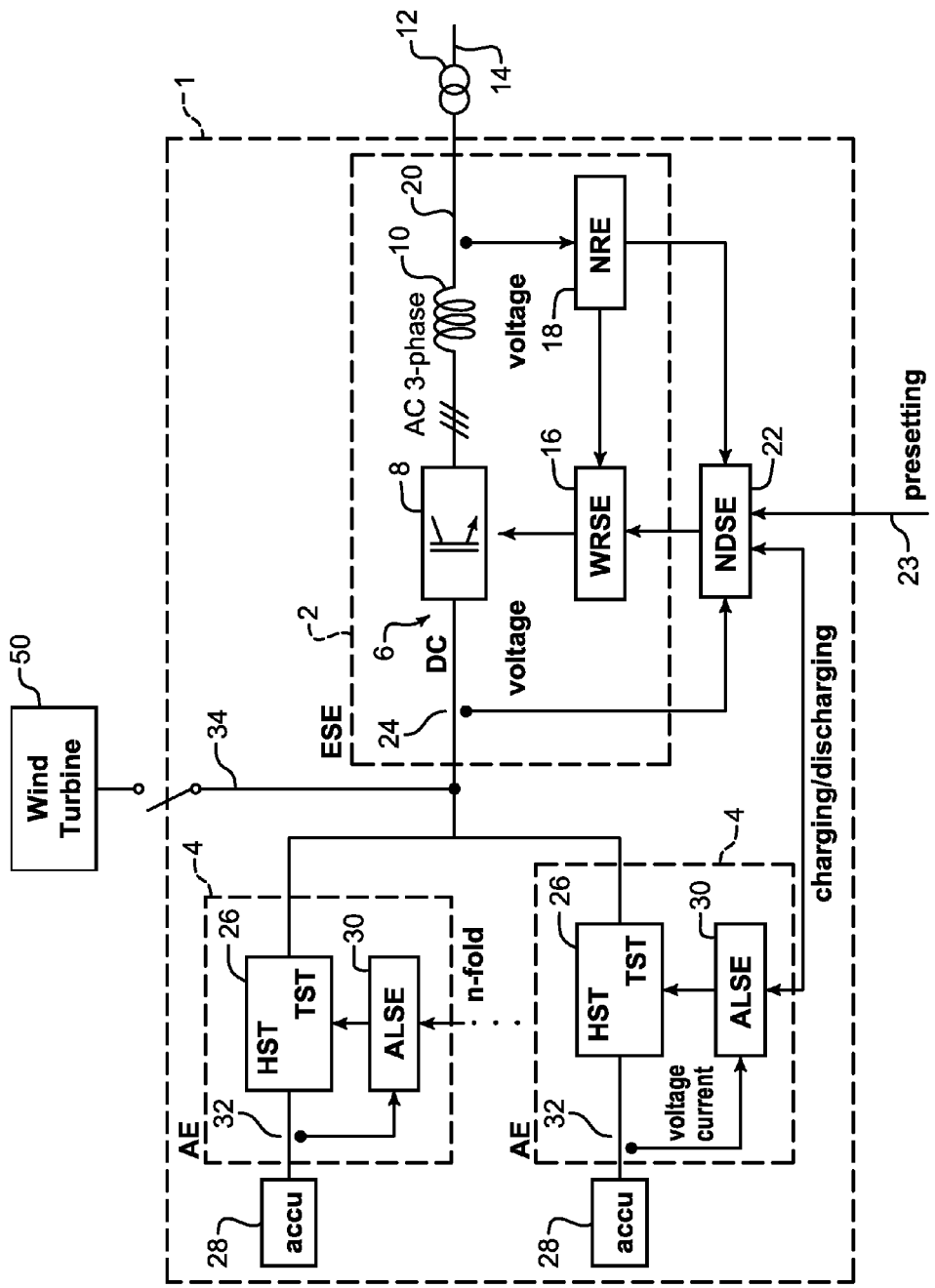
FIG. 1 shows a structure of a charging apparatus according to the invention.

The charging apparatus 1 substantially includes a feed-in unit 2 and a multiplicity of electric storage charge circuits 4. The electric storage charge circuits 4 are coupled to the feed-in unit 2 so that both a flow of energy between them and also information exchange can take place. FIG. 1 shows by way of example two electric storage charge circuits 4 and it is expected that many electric storage charge circuits 4—more specifically n, with n being in the range of 30 to 50—are provided within each charging apparatus 1. Of course, it would be sufficient to use only one electric storage charge circuit 4 in some embodiments.

The charging apparatus 1 also has a dc voltage intermediate circuit 6, by way of which the feed-in unit 2 is energy-coupled to the electric storage charge circuits 4. Energy obtained from electric storage charge circuits to the dc voltage intermediate circuit 6 can be converted into a three-phase ac voltage by way of the inverter and dc to ac converter 8, simply referred to herein as an inverter for ease of reference. There is connected a choke 10, from which three-phase alternating current generated by the inverter 8 is passed by way of a transformer 12, at which the ac voltage generated is transformed up in its amplitude for coupling to an electric grid or network 14. The transformer 12 is connected to the ac voltage network 14, sometimes call the grid. The network can be a local grid of a few hundred homes and a few power stations or it can be a part of a nationwide network grid.

Likewise energy can be taken from the ac voltage network 14 and fed by the inverter 8 to the dc voltage intermediate circuit 6, as direct current to the electric storage charge circuits.

An inverter control unit 16 is provided for controlling the inverter 8 for feeding electric energy into the ac voltage network 14. The unit 16 controls the inverter 8 both in regard to frequency, phase and amplitude of the voltage generated. Specific presetting of the voltage pattern can be provided in the inverter 8 or it can be predetermined by the inverter control unit 16 and fed into the inverter 8. For controlling the inverter 8 the inverter control unit 16 requires items of information about the ac voltage generated and/or the ac voltage of the ac voltage network 14. For that purpose there is provided a network referencing unit 18 which, at an ac voltage measurement location 20, measures and evaluates the ac voltage between the choke 10 and the transformer 12 and communicates information about ac network, including in particular about frequency, phase and amplitude of the voltage, to the inverter control unit 16. The referencing unit 18 can also be connected directly to the network 14 itself rather than to the signal after the transformer.

The measured and/or evaluated items of information are also transmitted by the network referencing unit 18 to a network service power control unit 22.

The network service power control unit 22 is substantially intended to co-ordinate the feed-in unit 2 and the electric storage charge circuits 4 with each other in dependence on the presetting values. For that purpose the network service power control unit 22 receives external presetting values by way of a presetting path 23, in particular presetting in respect of feeding active power into the network or taking therefrom and/or feeding reactive power into the network or taking it therefrom. Those presetting values can be transmitted from an external location into the feed-in unit 2 by way of that presetting path 23.

The network service power unit 22 gives corresponding items of information or control commands both to the electric storage charge circuits 4 via electric storage device charging control unit 30 on line 25, and also to the feed-in unit 2, in particular there to the inverter control unit 16.

The network service power control unit 22 also receives items of information in respect of voltage, current and/or power of the dc voltage intermediate circuit 6 by way of the intermediate circuit measurement location 24. Corresponding items of information can be partially forwarded to the inverter control unit 16. Moreover, a direct connection of the inverter control unit 16 to the intermediate circuit measurement location 24 is also provided in some instances. Moreover the network service power control unit 22 receives items of information in particular in respect of the network voltage by way of the network referencing unit 18. In addition the network service power control unit 22 can also obtain items of information such as for example about the charging condition or the prevailing capacity of each electric storage charge circuit, in particular from the electric storage device charging control unit 30 on line 25.

To control reactive power to be fed into or taken from the network, it is sufficient to control the feed-in unit 2, in particular the inverter control unit 16, using the inputs from line 23 and other locations and the electric storage charge circuits 4 are basically not affected.

To take account of presetting values in respect of active power to be fed into the network or taken therefrom, it is advantageous to take account of and coordinate both the feed-in unit 2 and also the electric storage charge circuits 4. In that case the available charging capacity of each electric storage device 8 connected to an electric storage charge circuit 4 and thus as a result also the total of all available charging capacities of all electric storage devices 28 can also be taken into account. It is to be noted that there is a connection between the network service power control unit 22 and each electric storage device control unit 30, that is to say the electric storage device charging control unit 30 of each electric storage charge circuit 4, which is in part indicated in FIG. 1.

Each electric storage charge circuit 4 is connected to the dc voltage intermediate circuit 6 so that energy can flow from the feed-in unit 2 to each electric storage charge circuit 4 or vice-versa. For that purpose each electric storage charge circuit 4 has a boost converter and buck converter block which is referred to hereinafter as the direct current converter 26 and is connected to the dc voltage intermediate circuit 6. It is not important in relation to the direct current converter 26 that it includes a boost converter and a buck converter respectively, as these are examples of circuits that can achieve the desired function but rather that the direct current converter can control direct current both from the dc voltage intermediate circuit 6 into the electric storage device 28 and also from the electric storage device 28 into the dc voltage intermediate circuit 6. Thus, any converter 26 which provides for the transmission of dc power both to and from the electric storage devices 28 is sufficient and many circuits of this type are well known in the art.

The electric storage device charging control unit 30 is provided for controlling the direct current converter 26. That electric storage device charging control unit 30 receives control values, in particular control presetting values, from the network service power unit 22. In particular it can obtain control presetting values as to whether the respective electric storage device 28 is to be charged or discharged, or whether it is to be neither charged nor discharged.

It should be mentioned at this point that the network service power control unit 22, besides the described signal paths, can also receive further items of information regarding various components in the system, for example about the charge condition of one or more electric storage devices 28.

To control the direct current converter 26 the electric storage device charging control unit 30 also receives items of information about the respective charging or discharging current to or from the electric storage device 28 as well as items of information about the charging voltage and the voltage of the electric storage device 28. For that purpose the corresponding voltage and the corresponding current are measured at the electric storage device measurement location 32 and inputted into the electric storage device charging control unit 30. Voltage, current and power can now be detected by way of the electric storage device measurement location 32.

FIG. 1 shows by way of example two electric storage devices 28. Preferably the electric storage devices 28 are of the type used in electric vehicles, and in particular lithium ion electric storage devices 28 of electric vehicles are used and correspondingly charged and/or discharged.

Figure 2:
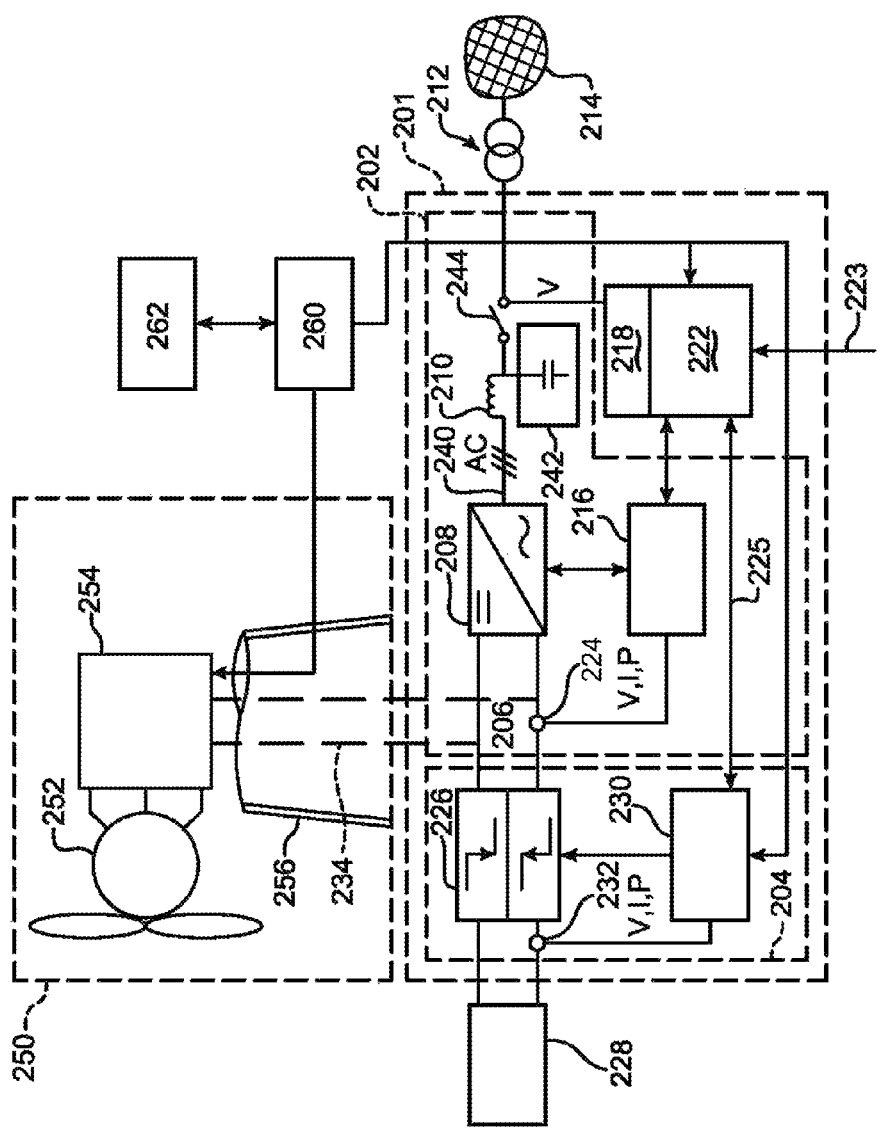
FIG. 2 shows a further structure of a charging apparatus according to the invention.

A coupling location 34 is provided for coupling the charging apparatus of FIG. 1 to a wind power installation, such as the wind power installation 250 of FIG. 2. By way of line 34, the wind power installation can be connected to the dc voltage intermediate circuit 6 of the charging apparatus 1. In this respect an embodiment provides that wind power is converted by means of rotor and generator into an electric alternating current which is subjected to rectification in the wind power installation 250 and which can then be passed to the dc voltage intermediate circuit 24 by means of the coupling location 34.

The charging apparatus in FIG. 2 substantially corresponds to the charging apparatus 1 in FIG. 1. For the sake of improved clarity the reference numerals in FIG. 2 correspond in their last two digits or in their last digit to the reference numerals of corresponding components of the charging apparatus 1 in FIG. 1. In that respect attention is also directed to FIG. 1 for the description of the corresponding components.

Thus the charging apparatus 201 has a feed-in unit 202 and a multiplicity of electric storage charge circuits 204 of which however only one is shown by way of example. Any connections which are shown for the electric storage charge circuit 204 illustrated by way of example are also provided for the further electric storage charge circuits 4 and 204 that are not shown. That also concerns the electric storage devices 228 connected to the electric storage charge circuit 204. The electric storage charge circuit 204 has a direct current converter 226 which includes, as one example, a boost converter and a buck converter and which is actuated by an electric storage device control unit 230. An electric storage device measurement location 232 is provided for recording voltage, current and power.

The direct current converter 226 is coupled by way of a dc voltage intermediate circuit 206 to the feed-in unit 202 and thus to the inverter 208. Actuation of the inverter 208 is effected by way of the inverter control unit 216 which receives voltage, current and/or power at the intermediate circuit measurement location 224. The inverter 208 ensures a flow of power (both active power and also reactive power) from the dc voltage intermediate circuit 206 to a three-phase ac voltage output 240 to which there are connected a choke 210 and a network filter 242, and vice-versa. In addition, provided at a measurement location for voltage detection, in particular network voltage detection, there is a switch 244 to permit an interruption in relation to the ac voltage network 214. The network voltage detection or network detection operation is effected by means of the network detection device 218 which is comparable in function to the network referencing unit 18 of the charging apparatus 1 in FIG. 1. The network detection unit 218 is closely coupled to a so-called FACTS controlling system or control unit 222 comparable to the network service power control unit 22 of the charging apparatus 1 in FIG. 1. The FACTS control unit 222 can be viewed together with the network detection device 218 as an independent unit which communicates both with the feed-in unit 202 and also the accumulator circuit 204. The detection device 218 can be either upstream or downstream of the transformer 212. At selected times, the switch 244 can be opened to ensure that measurements downstream of the transformer 212 are not affected by the feed-in unit 202.

Moreover the charging apparatus 201 in FIG. 2 for the network connection also uses a transformer 212 for connection to the ac voltage network 214.

FIG. 2 also shows coupling by way of the dc voltage intermediate circuit 206 to a wind power installation 250, as an option. The wind power installation 250 of which a pylon 256 is indicated also has a generator 252 for generating an electric, three-phase alternating current which is rectified by means of the rectifier 254. The rectifier 254 thus provides electrical coupling and a connection 234 to the dc voltage intermediate circuit 206.

Control of the wind power installation 250 is effected by way of the wind power installation control system 260. Associated therewith is a management plane 262 which can also give presetting values to the wind power installation control system 260. Such presetting values can also predetermine whether active power is to be delivered into or taken from the ac voltage network 214 and/or whether and to what extent reactive power is to be fed into or taken from the ac voltage network. Corresponding presetting values can be forwarded by the wind power installation control system 260 to the FACTS-control system 222. Thus the FACTS-control system 222 also permits matching of discharging and/or charging of connected electric storage devices 228 and the processes of feeding active power and/or reactive power into the ac voltage network and taking same therefrom. Optionally, the control system 222 can receive presetting values on line 223 from an outside control, or, in some embodiments, the line 223 is not present and the presetting values come only from the wind power control system 260.

In one embodiment, the charging apparatus 201 is closely adjacent to the wind power installation 250, for example, in the same building or sitting on a common physical site directly adjacent the roadway on which electric vehicles drive. As is well known, one cause of loss in the transmission electric power is the length of the long transmission lines to carry power generated at a distant source where land is available to homes or a town or business. In addition, there is significant cost to build such transmission lines as well as to obtain the right of way over stretch of property between where the power is generated and where it is consumed. There is also the issue that people often do not like to have their homes closely adjacent to a power generating plant. According to the structure of this invention, a wind power installation can be located directly adjacent to the roadway and thus will take up no more room than is already used by the road. The footprint on the ground of the wind power installation will be less than that now occupied by the standard gasoline or diesel fuel station, thus, less space, instead of more space will be used. If it is adjacent a standard fuel station, it would not take up more room than might be used for a few car stalls in the parking lot and thus could be used side-by-side with current fuel stations and not require any additional right of ways or land purchases. Thus, in one embodiment, a standard fuel station having gas and diesel will have adjacent to the building a wind power installation providing on-site, instant power to any charging of electric storage devices 228 that might be needed.

As cars drive along the road, they will see the wind power installation in the distance and know that in the coming miles, a fuel station is present and they do not need any special advertising or other signs. In this case, the presence of the wind turbine 250 is not a nuisance since it is along a roadway and not directly next to a person's home and now becomes a benefit since it provides an indication to anyone driving from several miles away that there is a location at which they can obtain fuel, either just electric or also diesel and gas. In one embodiment, the pylon can be painted a select color or carry a sign to indicate whether it is located on an electric only fuel station or at a fuel station with diesel, gas, a restaurant, a grocery store. The pylon will thus now become a welcome sight to the community and travelers.

In one example of operation, a fuel station may have in the range of 50 to 100 electric storage devices coupled to the charging apparatus 201, some of which are assured of being in the fully charged state and some of which are being recharged and thus are in the partially charged state. The charged state, whether full or partial, is sensed by the controller 230 and which provides feedback to the control 222 to ensure that there are always some fully charged electric storage devices at a particular location. When a driver of an electric vehicle enters the fuel station, his discharged batteries, called electric storage devices herein, are removed and a fully charged electric storage devices are put in their place. This quick change may take about two to three minutes, or perhaps less if easy to use sockets and access is provided. Thus, the driver does not need to wait a few hours to properly charge the batteries of his electric car, but can be on his way much quicker than even if he had to obtain diesel. The batteries from the car become the electric storage devices 228 of the system in FIG. 2 and are charged to be ready for the next use when that driver returns or another driver arrives. (Of course, an owner of an electric vehicle could purchase two sets of batteries and keep one at a particular fuel station near his home for easy and frequent switching and payment of a fee for charging them or, on the other hand, he could pay a set fee and have the right to use community batteries owned by a group or by the fuel stations that he will switch out again at any fuel station, among other possible techniques.)

While a group of electric storage devices 228 are coupled to the charging apparatus 201, a number of action are possible, as previously stated herein. For example, if there is high wind and it is in the middle of the night when electric power is not being consumed by home, the wind power installation can put all of the electricity it produces into the bank of electric storage devices 228 that sit at the local fuel station. There is highly efficient use of power since it does not need to be transported to a distant site and, in fact, does not even need to be converted into ac power. A coal fired electric power plant can be significant cut back to save the burning of fossil fuels since the wind power installation is providing all the power needed to charge the electric storage devices 228 and in some cases, will be putting power out into the network 214 as well. When morning comes and many drivers get on the road to go to work, the fuel station has a large number of electric storage devices 228 fully charged and ready for immediate use in the morning travel as drivers stop in to obtain fully charged batteries. The owner is thus able to avoid the expense of high current charging equipment bought just for his home and can have the benefit of the community fuel station for this recharged batteries. Rather than have expensive, computer controlled, high current charge units at thousands of individual homes, the fuel station has the controls and equipment for the whole community. During the middle of the day, when electric power use hits a peak, all of the power generated by the wind turbine can be put onto the network 214 and little or none of the power used to charge electric storage devices 228. This can be carried out at any time, morning, noon or evening, depending on the needs of the network 214 and the power being generated by wind power installation 250.

As explained herein, if the network has a need to large amount of reactive power or active power, the electric storage devices 228 themselves are coupled to the network via the charging unit 201 so that power can be provided from the bank of electric storage devices at one fuel station to the network. With a large number of fuel stations spread across the countryside, a very large amount of power, both active and reactive, and instantly be provided to the network 214 if needed at a particular time of high demand, such as mid-day or early evening. Power can thus be provided to the network both from the wind power installations 250 and the electric storage devices 228 at the same time.

On the other hand, if all of the electric storage devices at a particular station are discharged and the wind is not blowing, or the wind power installation is not providing the amount of power needed to charge to local bank of electric storage devices 228, then power can be drawn from the network 214 to charge a few of the electric storage devices 228 to ensure that there are always a few in the fully charged state for use by a driver who stops for an electric charge. Thus, if there is sufficient wind, most or possibly all, of the electric storage devices will be in the fully charged state and will be available, in the event there is high demand on the network, or provide immediate power to the network 214. If there is not sufficient wind, then the electric storage devices 228 could have many of them in the discharged state while some of them are charged with power from the network 214. In a preferred situation, the charge state of the bank of electric storage devices 228 will be managed to ensure there are sufficient for the expected electric vehicles that would stop, but even if there are none, the driver might be able to take partially charged battery 228 sufficient to drive to the next station or he might need to wait longer while an electric storage device 228 is charged from the grid 214 when he stops if none are sufficiently charged for his current use.

The use and source of the electric power can therefore be managed for the maximum benefit and lowest possible cost for the source. Depending on the time of day and the cost of the electric power at that time of day, the power can flow either to or from the network 214 from or to the electric storage devices 228 and either from the wind power installation to the electric storage devices 228 or to the network 214. In many cases, it will be preferred if there is sufficient wind to first charge up all electric storage devices at the local site 201 to save the power loss of carrying the electricity on the transmission lines, but depending on the needs of the network 214, this can be bypassed and all the power from the wind power installation put onto the network 214, with appropriate providing of reactive power from the electric storage devices 228.

A large bank of electric storage devices 228 have a significant ability to provide reactive power. Having the batteries that might normally be sitting in a person's home unused being made available to assist in the reactive power needs of the network is a significant benefit, particularly if such are provided at spaced locations across an entire country.

With this system a number of problems are solved. First, a network of filling stations for electric cars is provided along the highway. Second, a ready supply of batteries is immediately adjacent each of these wind power installations with no additional cost to the wind turbine supplier. What has been considered an expense of the wind power installation is now a benefit since the many electric batteries being carried in cars on the road will now become a mobile power storage system for all wind turbines along the roadway. When the wind turbine maker is obtaining batteries to store extra charge, he will select ones that are usable in electric cars and obtain a fee for renting them out. Third, the drivers of vehicles do not need to be worried about long charge times to properly charge a battery to avoid damage to it since this can be properly handled by the control systems 230, 222 and other devices. Fourth, the driver is provided a quick and easy source of electric power which, when not in use in the vehicle, becomes a substantial benefit to the system as a whole and to the community. Fifth, significant economies of scale are provided by saving the transmission of large amounts of power when it can be used locally at the wind power installation if there is a need and also have the option of putting it on the network 214 so that fossil fuel electric generation plants, such as coal or gas, can be shut down or operated at reduced power. These are just a few of the benefits, there are many others.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A charging apparatus for charging electric storage devices of electric vehicles including
a feed-in unit for feeding electric energy into an electric ac voltage network including
an electric dc voltage intermediate circuit for the intermediate storage of electric energy with an intermediate circuit voltage, and
an inverter circuit for converting a direct current of the dc voltage intermediate circuit into an alternating current for feeding it into the electric ac voltage network and for converting an alternating current from the ac voltage network into a dc voltage for feeding it into the dc voltage intermediate circuit, and
at least one electric storage charge circuit for at least partial charging one of the electric storage devices from the dc voltage intermediate circuit and for at least partial discharging of one of the electric storage devices into the dc voltage intermediate circuit.

2. A charging apparatus according to claim 1 wherein the feed-in unit is provided to feed reactive power into the electric ac voltage network and wherein a feed-in unit of a wind power installation is used as the feed-in unit.

3. A charging apparatus according to claim 1 wherein the feed-in unit is provided for controlling the intermediate circuit voltage to a predeterminable value.

4. A charging apparatus according to claim 1 wherein 1 the feed-in unit is designed to selectively feed active power into the ac voltage network or take active power from the ac voltage network and to feed reactive power into the ac voltage network or take reactive power from the ac voltage network.

5. A charging apparatus according to claim 1 comprising an input interface for the input of an active power reference value for predetermining an active power to be fed into or taken from the ac voltage network and/or for the input of an reactive power reference value for predetermining a reactive power to be fed into or taken from the ac voltage network.

6. A charging apparatus according to claim 1 wherein the at least one electric storage charge circuit is electrically connected to the dc voltage intermediate circuit and is adapted to be insensitive in respect of variations in the intermediate circuit voltage.

7. A charging apparatus according to claim 1 including a network service power control unit for coordinating the control of the feed-in unit and the at least one electric storage charge circuit.

8. A charging apparatus according to claim 1 wherein the at least one electric storage charge circuit comprises at least one of the following:
- a buck converter connected to the dc voltage intermediate circuit for controlling a charging current for at least partial charging of the electric storage device, and
- a boost converter connected to the dc voltage intermediate circuit for controlling a discharging current for at least partial discharging of the electric storage device.

9. A charging apparatus according to claim 1 wherein at least one electric storage charge circuit has an electric storage device charging control unit for controlling at least one of a boost converter, a buck converter, and for detecting:
- a charging or discharging current,
- an electric charging voltage of an electric storage device connected to the electric storage charge circuit, and
- a charging or discharging power and a charging condition of an electric storage device connected to the electric storage charge circuit.

10. A charging apparatus according to claim 1 wherein there are provided a plurality of electric storage charge circuit for at least partial charging and/or discharging of a respective electric storage device.

11. A charging apparatus according to claim 1 wherein the feed-in unit is provided for connection to a wind power installation to make an electric connection between the wind power installation and the dc voltage intermediate circuit.

12. A charging apparatus according to claim 1 comprising a switching means for selecting a mode of operation between the following:
- with wind power installation and with electric storage charge circuit,
- without wind power installation and with electric storage charge circuit,
- with wind power installation and without electric storage charge circuit, and/or
- without wind power installation and without electric storage charge circuit.

13. A wind power installation for converting wind power into electric energy including a charging apparatus according to claim 1.

14. An electric filling station including
a wind power installation according to claim 13 and
at least one electric storage device connected to the charging apparatus, wherein an electric storage device is provided to be exchanged in the charged condition for an entirely or partially discharged electric storage device of an electric vehicle.

15. Use of a feed-in unit of a wind power installation as a feed-in unit of a charging apparatus for charging electric storage devices of electric vehicles,
wherein the feed-in unit includes
an electric dc voltage intermediate circuit for the intermediate storage of electric energy with an intermediate circuit voltage, and
an inverter circuit for converting a direct current of the dc voltage intermediate circuit into an alternating current, for feeding it into an electric ac voltage network and for converting an alternating current from the ac voltage network into a direct current for feeding it into the dc voltage intermediate circuit, and
a respective electric storage charge circuit coupled to the dc voltage intermediate circuit is used for at least partial charging of one of the electric storage devices from the dc voltage intermediate circuit and for at least partial discharging of one of the electric storage devices into the dc voltage intermediate circuit.

16. A method of controlling a charging apparatus connected to an ac voltage network for at least one of charging and discharging electric storage devices of electric vehicles including the steps:
receiving an item of presetting information for predetermining feeding active power into the ac voltage network or taking active power from the ac voltage network and feeding reactive power into the ac voltage network or taking reactive power from the ac voltage network, and
controlling the charging apparatus in dependence on the presetting information to feed active power into the ac voltage network or take active power from the ac voltage network and/or to feed reactive power into the ac voltage network or take reactive power from the ac voltage network, and/or
controlling the charging apparatus in such a way that in dependence on the presetting information at least one of the electric storage devices is at least partially charged or discharged.

17. A method according to claim 16 wherein a plurality of the electric storage devices are connected to the charging apparatus and in particular a respective electric storage device is connected to an electric storage charge circuit, wherein each of the electric storage devices is individually charged or discharged.

18. A method according to claim 16 wherein a charging apparatus is controlled that is coupled to a wind power installation for producing electric energy from wind energy and in dependence on the available wind energy and/or in dependence on the presetting information at least one of the electric storage devices is charged with electric energy produced from wind energy.

* * * * *